UNITED STATES PATENT OFFICE.

CHARLES A. MAXFIELD, OF NEW YORK, N. Y., ASSIGNOR TO THE OZOKERITE WATERPROOF PAPER COMPANY; SAID COMPANY ASSIGNOR TO JACOB WALLACE, OF SAME PLACE, TRUSTEE.

PRESERVING AND WATERPROOFING PAPER.

SPECIFICATION forming part of Reissued Letters Patent No. 10,618, dated June 30, 1885.

Original No. 278,443, dated May 29, 1883. Application for reissue filed May 23, 1885.

*To all whom it may concern:*

Be it known that I, CHARLES A. MAXFIELD, a citizen of the United States, residing at New York, in the county of New York and State of New York, have invented certain new and useful Improvements in Preserving and Waterproofing Paper; and I do declare the following to be a full, clear, and exact description of the invention, such as will enable others skilled in the art to which it appertains to make and use the same.

My invention relates to preserving and waterproofing paper; and it consists in saturating paper with a natural bitumen or wax known as "ozocerite." The same object will be effected by applying the said ozocerite to both surfaces of the paper.

My invention is partly designed to supply a long-felt want among meat and fish venders, in producing a paper which will be water-proof, and at the same time will not impart to the article inclosed within the paper discoloration or a disagreeable odor.

Paper has heretofore been rendered water-proof by means of paraffine, which answers the purpose well; but owing to its cost it has not and cannot come into general use. Paper has also been rendered water-proof by means of coal-tar and its products; but, owing to its offensive odor, it cannot be used to wrap provisions of any kind, and its use is necessarily confined to wrapping hardware or in wrapping articles to protect them from the ravages of insects.

In carrying out my invention I utilize any of the well-known machines in the manufacture of roofing-felt, in which a heating-tank is provided, and devices for removing a surplus of the saturating material. I then place the ozocerite in the melting-tank and reduce it by heat to the desired consistency. I do not confine myself to the application of heat for reducing the ozocerite to a fluid or semi-fluid condition, as this may be accomplished by solvents or by chemical means. The paper, which is in long strips or rolls, is then drawn through the melted or liquid ozocerite, and any surplus of the said material removed therefrom. The paper may then be passed through a drying-chamber, so that the paper can be cut to the desired size and packed into reams and bundles ready for use. I may find it convenient and desirable to take the paper as it comes from the paper-making machine, and before it is quite dry, and subject it to the action of the ozocerite.

The prime object of my invention is to saturate the ordinary wrapping-paper used by butchers and meat and fish venders with a compound which will be odorless and colorless—that is, will not discolor the article—and at the same time render it water-proof and strong.

Another advantage of my invention is that a much lighter paper can be used, and the slight cost of the saturating material makes it possible thereby to produce a paper which will cost but a trifle more than the ordinary wrapping-paper.

Having thus described my invention, what I claim and desire to secure by Letters Patent, is—

As a new article of manufacture, paper saturated or treated with ozocerite, substantially as explained, to render it water-proof and durable.

In testimony whereof I affix my signature in presence of two witnesses.

CHARLES A. MAXFIELD.

Witnesses:

J. E. M. BOWEN,

HUGO KOELKER.